Nov. 6, 1923.

Re. 15,713

O. ALLEN, JR

SPARK PLUG

Original Filed May 17, 1920

Inventor:
Oglesby Allen Jr.
by William [illegible] Atty.

Reissued Nov. 6, 1923. Re. 15,713

UNITED STATES PATENT OFFICE.

OGLESBY ALLEN, JR., OF CHICAGO, ILLINOIS, ASSIGNOR TO ALLEN SPECIALTY COMPANY, OF CHICAGO, ILLINOIS, A CORPORATION OF ILLINOIS.

SPARK PLUG.

Original No. 1,394,523, dated October 25, 1921, Serial No. 381,934, filed May 17, 1920. Application for reissue filed July 30, 1923. Serial No. 654,719½.

*To all whom it may concern:*

Be it known that I, OGLESBY ALLEN, Jr., a citizen of the United States, and a resident of Chicago, in the county of Cook and State of Illinois, have invented certain new and useful Improvements in Spark Plugs; and I do hereby declare that the following is a full, clear, and exact description thereof, reference being had to the accompanying drawings, and to the characters of reference marked thereon, which form a part of this specification.

This invention relates to improvements in spark or ignition plugs for the ignition systems of explosion engines, and the invention consists in the combination and arrangement of the parts shown in the drawings and described in the specification, and is more particularly pointed out in the appended claims.

Among the objects of the invention is to provide a spark plug which is made of few rugged and durable parts which are simple to construct and assemble, and which may be made at a relatively low cost as compared to the efficiency of the plug.

Another object of the invention is to produce a spark plug which does not foul in operation in a manner to short circuit above the arcing points of the terminals, and in this respect to provide means associated with the live terminal above the sparking point thereof which acts as a heat retainer on the live terminal for the double purpose of retaining heat thereat and to avoid clinging of carbon thereto, said heat retainer being of a material to avoid the deposit of carbon thereon.

A further object of the invention is to provide a construction and arrangement of the shell and porcelain insulator which will permit the insulator to be made relatively short so as to keep it away from the carbon depositing zone, and which, at the same time materially reduces the cost of the insulator.

A further object of the invention is to improve the construction and arrangement of the grounded terminals, and especially of that type where twin grounded terminals are employed.

Figure 1:
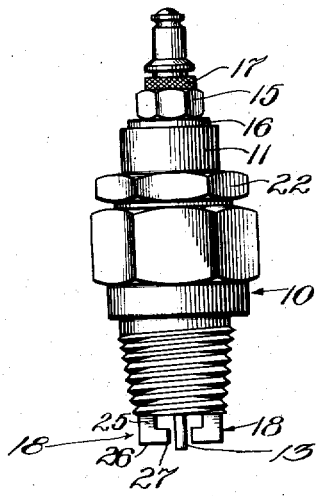
Figure 1 is a side elevation of a spark plug embodying my invention.
Figure 3:
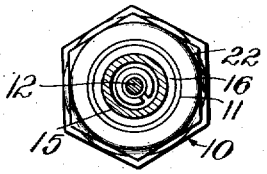
Figure 2:
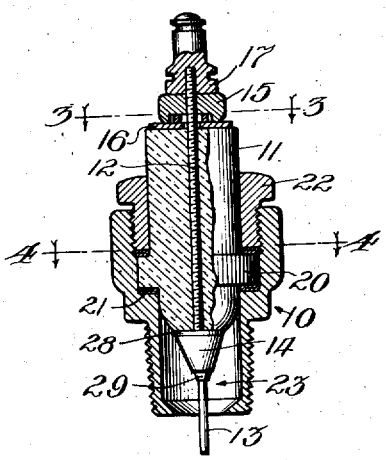
Figure 2 is an axial section thereof, with parts in elevation.
Figure 4:
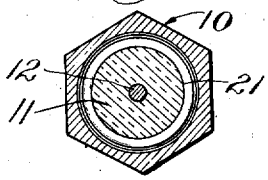

Figures 3 and 4 are cross sections on the respective lines 3—3 and 4—4 of Figure 2.

Figure 5:
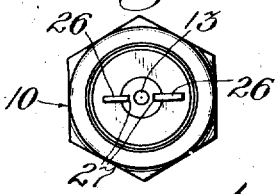

Figure 5 is a bottom end view of the plug.

As shown in said drawings:

10 designates the metal shell of the plug, 11 the porcelain, or other insulator, therein and extending upwardly from the top of the shell, 12 a rod which extends through an axial opening in the insulator and upwardly above the same, and extends below said insulator and the shell to constitute the live terminal 13 of the plug. Said rod is threaded and is held in place between a collar 14 at the lower end of the insulator and a nut 15 threaded to the rod above the insulator that bears against an insulating washer 16 that lies upon the upper end of the insulator. A threaded cap nut 17 engages the threaded rod above the nut 15 to act with the nut 15 as a binding screw for a circuit wire at one side of the ignition circuit. 18 designates the grounded terminals, there being two in the construction shown arranged symmetrically with respect to the live terminal 13.

The shell has an enlarged bore open at its top to receive a cylindric enlargement 20 of the insulator, providing thereon upwardly and downwardly facing shoulders to oppose a shoulder 21 in the shell and the lower end of a nut 22 that enters the enlarged bore of the shell and is threaded thereto. Thus the insulator is held from axial displacement in the shell. Yielding washers are interposed between said shoulders on the insulator and the shoulder 21 and lower end of the nut 22 to avoid straining the insulator in a manner to check the same. The lower end of the shell is reduced and exteriorly threaded, and said reduced portion of the shell has a relatively small diameter bore to constitute a chamber 23 in which the collar 14 is inclosed. The grounded terminals are made integral parts of the lower reduced end of the shell and are disposed on the circle of the shell 180 degrees apart. The said terminals consist each of a vertical shank 25 and an inturned portion 26 which terminates the proper sparking distance from the live terminal, and the said inturned portions 26 are formed adjacent to the live terminal with vertical sparking edges 27.

The collar 14 is threaded on the rod 12 and is spaced from the lower end of the porcelain insulator by an insulating washer 28 of substantial thickness and of not less diameter than the lower end of said porcelain. The said collar bears at its lower end on a shoulder 29 formed, preferably, integral with the rod 12, so that said collar is confined between said shoulder 29 and the washer 28 at the lower end of the porcelain.

The said collar is made of a material that will receive a high polish and one which will also retain heat under operating temperature, brass or other copper compound being a suitable material, depending upon the operating heat. It is shown as of general inverted conical shape with its lower end of smallest diameter so as to increase rapid heating of the body of the collar due to the thin lower edge of the collar. I have found that such a material as brass when polished and under the temperature to which it will be subjected in operation of the plug acts to reject carbon deposit and is readily maintained unfouled over a long period of time. Moreover there is interposed between the upper larger end of the collar and the lower end of the insulator, which is tapered at said lower end with a terminal diameter not greater than the base of the conical collar and its associated insulating washer 28, which said insulating washer has the effect to prevent leakage of current from the collar to any carbon deposit on the lowered tapered end of the porcelain and thence to the grounded shell, the insulating washer 28 serving as a barrier against such leakage. Moreover the tapering of the lower end of the insulator serves further to minimize leakage of current from the collar 14 to the shell, because whatever carbon may lodge on the lower tapered end of the insulator is spaced a safe distance from the shell, even though there be a tendency to leakage from the collar 14 to carbon deposit on said tapered end of the insulator, and the barrier between the upper larger end of the collar 14 and carbon deposit at the full diameter of the insulator is sufficiently great to be safe.

It will thus be seen that the entire arrangement of the parts within the thin walled lower part of the shell goes toward barrier interference between the live terminal and the metal parts associated therewith above the sparking point of the terminals, so that sparking between the intended points or lines of the terminals is insured; and further that said arrangement is such as to maintain said parts free from leakage over relatively long periods of time. Thus there is assured great saving of time in keeping the spark plug in good firing condition, and is also assured full snappy sparks that will ignite the compressed charges to the best advantage, and thereby avoid wastage of fuel due to defective non-sparking.

It will be noted that a spark plug possessing these advantages is simple, is rugged and long lived and can be made at small cost.

I claim:

1. A spark plug, comprising a shell, an insulator within said shell and terminating above the inner end thereof, so that an open chamber is left at the inner end of the shell, a terminal rod extending through said insulator and projecting beyond the inner end of the shell, and an inwardly tapering or conical metallic carbon-rejecting element surrounding said terminal, said element having greater heat conductivity than said terminal and having a highly polished surface.

2. A spark plug, comprising a shell, an insulator within said shell and terminating above the inner end thereof, so that an open chamber is left at the inner end of the shell, a terminal rod extending through said insulator and into the said chamber of the shell, and a metallic carbon-rejecting element surrounding said terminal, said element having high heat retaining properties relatively to said terminal and capable of a highly polished surface.

3. In a spark plug as set forth in claim 1, an insulating washer interposed between said metallic element and said insulator, said washer having a diameter not less than the base of said conical element, and being of substantial thickness to thereby serve as a barrier to prevent leakage due to any carbon deposit between the inner end of the insulator and the adjacent base of said conical metallic element.

In testimony whereof I claim the foregoing as my invention, I hereunto append my signature at Chicago, Illinois, this 29th day of June, 1923.

OGLESBY ALLEN, Jr.